US010720004B2

(12) United States Patent
Raquepaw et al.

(10) Patent No.: US 10,720,004 B2
(45) Date of Patent: Jul. 21, 2020

(54) METHOD AND APPARATUS FOR PROVIDING AUTOMATED SAFE DEPOSIT BOX DELIVERY

(71) Applicant: JPMorgan Chase Bank, N.A., New York, NY (US)

(72) Inventors: Joe Raquepaw, Delaware, OH (US); Lauren Ready, Westerville, OH (US); Gary Desilva, Hilliard, OH (US); Eric C. Thinguldstad, New Albany, OH (US); Jeffrey Dean Mathwig, Worthington, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/210,675

(22) Filed: Dec. 5, 2018

(65) Prior Publication Data

US 2019/0172299 A1 Jun. 6, 2019

Related U.S. Application Data

(60) Provisional application No. 62/595,485, filed on Dec. 6, 2017.

(51) Int. Cl.
*G06Q 40/00* (2012.01)
*G07F 17/10* (2006.01)
*G06F 21/35* (2013.01)
*H04W 4/80* (2018.01)
*G06F 21/32* (2013.01)

(52) U.S. Cl.
CPC ............ *G07F 17/105* (2013.01); *G06F 21/32* (2013.01); *G06F 21/35* (2013.01); *H04W 4/80* (2018.02)

(58) Field of Classification Search
CPC ... B65G 1/02; B65G 1/10; B65G 1/12; B65G 1/137; B65G 1/16; B65G 3/00; B65G 3/04; G07F 17/10; G07F 17/105; G07F 17/12; G07F 17/14; G07F 17/145
See application file for complete search history.

(56) References Cited

U.S. PATENT DOCUMENTS 4,792,270 A * 12/1988 Yoshida ............... B65G 1/1371 186/37
10,096,183 B2 * 10/2018 Nitu ................... G07C 9/00912
(Continued)

*Primary Examiner* — Thien M Le
*Assistant Examiner* — April A Taylor
(74) *Attorney, Agent, or Firm* — Greenblum & Bernstein, P.L.C.

(57) ABSTRACT

Various methods, apparatuses, and media for providing an automated delivery of a safe deposit box are provided. The methodology includes operations of receiving a first user request for the delivery of the safe deposit box, the first user request including user account information; determining, based on information included in the first user request, a safe deposit box warehouse facility location that relates to the safe deposit box to be delivered, and determining at least one facility parameter; determining, based on the information included in the first user request, user delivery requirements; determining, based on each of the safe deposit box warehouse facility location, the at least one facility parameter, and the user delivery requirements, at least one delivery option; receiving a user selection of a desired delivery option; and transmitting information relating to a delivery schedule for delivering the safe deposit box.

20 Claims, 5 Drawing Sheets

(56) References Cited

U.S. PATENT DOCUMENTS

2018/0170675 A1\*  6/2018  High ................... G06Q 10/0832
2019/0077597 A1\*  3/2019  Janwadkar .............. C07F 11/00
2019/0392370 A1\* 12/2019  Kashi ................. G07C 9/00912

\* cited by examiner

METHOD AND APPARATUS FOR PROVIDING AUTOMATED SAFE DEPOSIT BOX DELIVERY

CROSS-REFERENCE TO RELATED APPLICATION

This application claims the benefit of U.S. Provisional Patent Application Ser. No. 62/595,485, filed Dec. 6, 2017, which is hereby incorporated by reference in its entirety.

BACKGROUND

1. Field of the Disclosure

This technology generally relates to handling safe deposit boxes, and more particularly, to methods and apparatuses for automating a safe deposit box delivery system.

2. Background Information

In the current marketplace, there have been no significant enhancements in the conventional way safe deposit boxes are accessed by customers. Customers typically must travel to physical bank branches in order to access their safe deposit boxes.

Accessing safe deposit boxes at a physical bank branch involves various limiting factors, which may include long wait lists to access the safe deposit boxes and a limitation on a number of boxes that a branch is able to sell to a customer. These limiting factors may cause inefficiency, for example, in the form of delays for the customers to access their safe deposit box at times of urgent need. Further, the customers may be restricted to access the safe deposit boxes only at the physical location of the bank branch.

Unfortunately, when customers relocate their home residences to a new location, they typically must endure a long process of switching their banks by closing their safe deposit box accounts at the old bank branch and open a new safe deposit box account at a new bank branch that is more convenient to the relocated location. This causes the customers to face a significant amount of inconvenience in accessing their safe deposit boxes.

SUMMARY

The present disclosure, through one or more of its various aspects, embodiments, and/or specific features or sub-components, provides, inter alia, various systems, servers, devices, methods, media, programs, and platforms for automating a safe deposit box delivery system. The various aspects, embodiments, features, and/or sub-components provide optimized processes for automated safe deposit box delivery.

According to an aspect of the present disclosure, a method for providing an automated delivery of a safe deposit box is provided. The method is implemented by a safe deposit box management device that includes a processor and a communication interface. The method includes: receiving, by the processor via the communication interface, a first user request for the delivery of the safe deposit box, the first user request including user account information; determining, based on information included in the first user request, at least one safe deposit box warehouse facility location that relates to the safe deposit box to be delivered; determining, based on the determined at least one safe deposit box warehouse facility location, at least one facility parameter; determining, based on the information included in the first user request, at least one user delivery requirement that relates to the safe deposit box to be delivered; determining, based on each of the at least one safe deposit box warehouse facility location, the at least one facility parameter, and the at least one user delivery requirement, at least one delivery option; receiving, by the processor via the communication interface, a user selection from among the at least one delivery option; and transmitting, via the communication interface, information relating to a delivery schedule for delivering the safe deposit box, the delivery schedule being determined based on the received user selection.

The safe deposit box may include a communicator configured to communicate with the safe deposit box management device by using at least one from among a wireless fidelity protocol and a Bluetooth protocol. The method may further include tracking at least one box parameter by receiving a transmission from the communicator. The at least one box parameter may include at least one from among a current location of the safe deposit box, a box opening time at which the safe deposit box is accessed, a box closing time at which the safe deposit box is closed, and an identification of a person that has accessed the safe deposit box.

The safe deposit box may include at least one from among a near field communication sensor and a biometric sensor configured to sense information that relates to the identification of the person that has accessed the safe deposit box. The biometric sensor may include at least one from among a fingerprint sensor and a facial recognition sensor.

The at least one facility parameter may include at least one from among a number of pending requests at the safe deposit box warehouse facility, a delivery vehicle availability of the safe deposit box warehouse facility, operation hours of the safe deposit box warehouse facility, and a number of available resources at the safe deposit box warehouse facility.

The method may further include authenticating the received first user request by prompting a user to provide identification information and determining whether the identification information relates to a person that is authorized to receive the delivery of the safe deposit box.

The method may further include receiving the first user request from a client device on which a safe deposit box accessing application has been downloaded. The client device may include at least one from among a personal computing device and a smart phone.

The method may further include: receiving, from the client device, a second user request that relates to accessing the safe deposit box; authenticating the received second user request by prompting the user to provide identification information and determining whether the identification information relates to an authorized user; and receiving, from the client device, a third user request that relates to unlocking the safe deposit box. The identification information may include at least one from among information sensed by a near field communication sensor, fingerprint information of the user and facial recognition information of the user.

According to another aspect of the present disclosure, a safe deposit box management device configured to provide an automated delivery of a safe deposit box is provided. The safe deposit box management device includes a communication interface and a processor. The processor is configured to: receive, via the communication interface, a first user request for the delivery of the safe deposit box, the first user request including user account information; determine, based on information included in the first user request, at least one safe deposit box warehouse facility location that relates to the safe deposit box to be delivered; determine, based on the determined at least one safe deposit box warehouse facility location, at least one facility parameter; determine, based on the information included in the first user request, at least one user delivery requirement that relates to the safe deposit box to be delivered; determine, based on each of the at least one safe deposit box warehouse facility location, the at least one facility parameter, and the at least one user delivery requirement, at least one delivery option; receive, via the communication interface, a user selection from among the at least one delivery option; and transmit, via the communication interface, information relating to a delivery schedule for delivering the safe deposit box, the delivery schedule being determined based on the received user selection.

The safe deposit box may include a communicator configured to communicate with the safe deposit box management device by using at least one from among a wireless fidelity protocol and a Bluetooth protocol. The processor may be further configured to track at least one box parameter by receiving a transmission from the communicator. The at least one box parameter may include at least one from among a current location of the safe deposit box, a box opening time at which the safe deposit box is accessed, a box closing time at which the safe deposit box is closed, and an identification of a person that has accessed the safe deposit box.

The safe deposit box may include at least one from among a near field communication sensor and a biometric sensor configured to sense information that relates to the identification of the person that has accessed the safe deposit box. The biometric sensor may include at least one from among a fingerprint sensor and a facial recognition sensor.

The at least one facility parameter may include at least one from among a number of pending requests at the safe deposit box warehouse facility, a delivery vehicle availability of the safe deposit box warehouse facility, operation hours of the safe deposit box warehouse facility, and a number of available resources at the safe deposit box warehouse facility.

The processor may be further configured to authenticate the received first user request by prompting a user to provide identification information and determining whether the identification information relates to a person that is authorized to receive the delivery of the safe deposit box.

The processor may be further configured to receive the first user request from a client device on which a safe deposit box accessing application has been downloaded. The client device may include at least one from among a personal computing device and a smart phone.

The processor may be further configured to: receive, from the client device, a second user request that relates to accessing the safe deposit box; authenticate the received second user request by prompting the user to provide identification information and determining whether the identification information relates to an authorized user; and receive, from the client device, a third user request that relates to unlocking the safe deposit box. The identification information may include at least one from among information sensed by a near field communication sensor, fingerprint information of the user and facial recognition information of the user.

According to yet another aspect of the present disclosure, a non-transitory computer readable medium configured to store instructions for implementing a method for providing an automated delivery of a safe deposit box is provided. When executed, the instructions cause a computer to: receive a first user request for the delivery of the safe deposit box, the first user request including user account information; determine, based on information included in the first user request, at least one safe deposit box warehouse facility location that relates to the safe deposit box to be delivered; determine, based on the determined at least one safe deposit box warehouse facility location, at least one facility parameter; determine, based on the information included in the first user request, at least one user delivery requirement that relates to the safe deposit box to be delivered; determine, based on each of the at least one safe deposit box warehouse facility location, the at least one facility parameter, and the at least one user delivery requirement, at least one delivery option; receive a user selection from among the at least one delivery option; and transmit, to a user, information relating to a delivery schedule for delivering the safe deposit box, the delivery schedule being determined based on the received user selection.

The safe deposit box may include a communicator configured to communicate with the safe deposit box management device by using at least one from among a wireless fidelity protocol and a Bluetooth protocol. The instructions may further cause the computer to track at least one box parameter by receiving a transmission from the communicator. The at least one box parameter may include at least one from among a current location of the safe deposit box, a box opening time at which the safe deposit box is accessed, a box closing time at which the safe deposit box is closed, and an identification of a person that has accessed the safe deposit box.

The safe deposit box may include at least one from among a near field communication sensor and a biometric sensor configured to sense information that relates to the identification of the person that has accessed the safe deposit box. The biometric sensor may include at least one from among a fingerprint sensor and a facial recognition sensor.

The instructions may further cause the computer to authenticate the received first user request by prompting a user to provide identification information and determining whether the identification information relates to a person that is authorized to receive the delivery of the safe deposit box.

The instructions may further cause the computer to receive the first user request from a client device on which a safe deposit box accessing application has been downloaded. The client device may include at least one from among a personal computing device and a smart phone.

The instructions may further cause the computer to: receive, from the client device, a second user request that relates to accessing the safe deposit box; authenticate the received second user request by prompting the user to provide identification information and determining whether the identification information relates to an authorized user; and receive, from the client device, a third user request that relates to unlocking the safe deposit box. The identification information may include at least one from among information sensed by a near field communication sensor, fingerprint information of the user and facial recognition information of the user.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
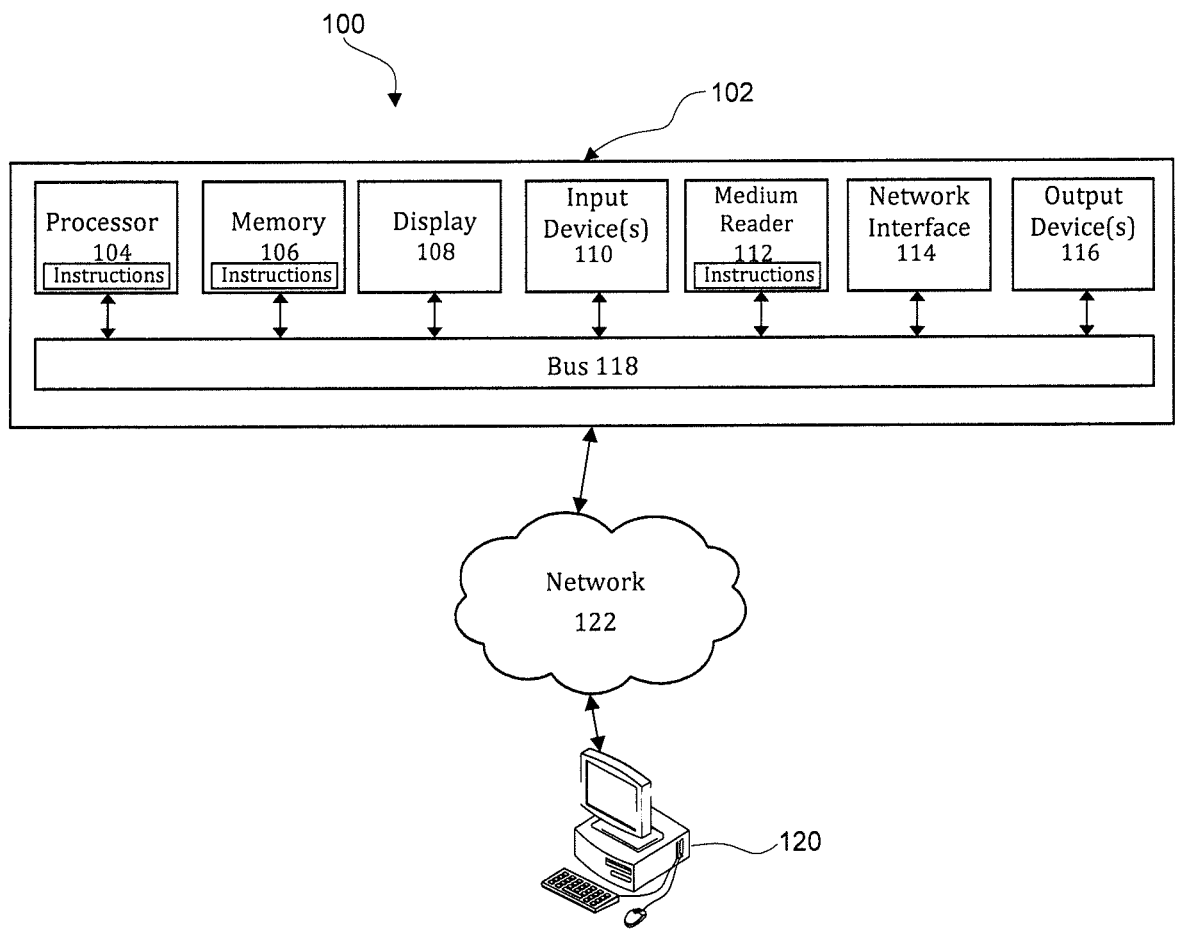
FIG. 1 illustrates an exemplary computer system for providing an automated delivery of a safe deposit box.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of providing an automated delivery of a safe deposit box.

Figure 2:
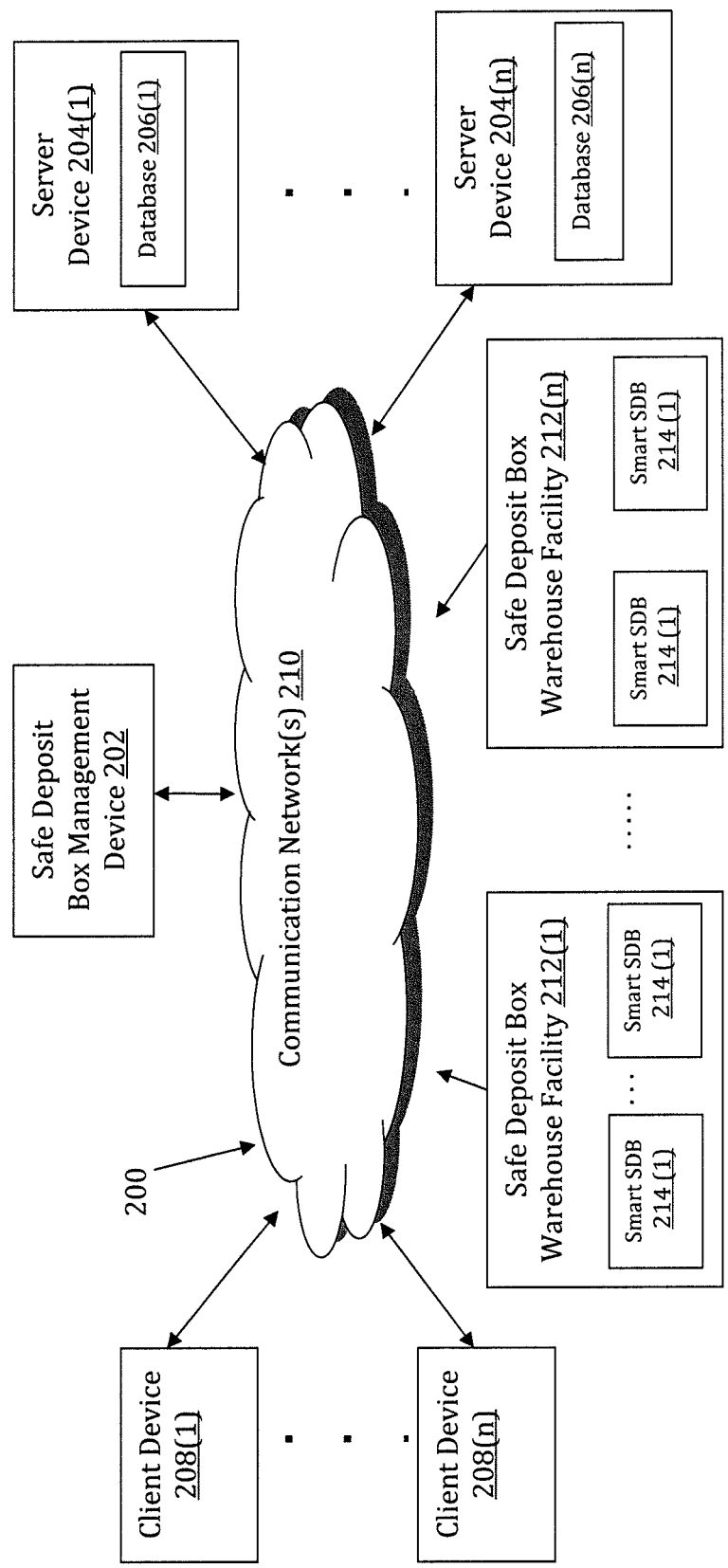
FIG. 2 illustrates an exemplary diagram of a network environment with a safe deposit box management.

Referring to FIG. 2, a schematic of an exemplary network environment 200 for providing an automated delivery of a safe deposit box is illustrated. The system for providing an automated delivery of a safe deposit box enables a user to request a safe deposit box remotely and securely by executing an application that is downloadable to a personal computer and/or a smart phone.

The system for providing an automated delivery of a safe deposit box may be implemented by a Safe Deposit Box Management (SDBM) device 202. The SDBM device 202 may be the same or similar to the computer system 102 as described with respect to FIG. 1. The SDBM device 202 may store one or more applications that can include executable instructions that, when executed by the SDBM device 202, cause the SDBM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SDBM device 202 itself, may be located in virtual server(s) running in a cloud-based computing environment rather than being tied to one or more specific physical network computing devices. Also, the application(s) may be running in one or more virtual machines (VMs) executing on the SDBM device 202. Additionally, in one or more embodiments of this technology, virtual machine(s) running on the SDBM device 202 may be managed or supervised by a hypervisor.

In the network environment 200 of FIG. 2, the SDBM device 202 is coupled to a plurality of server devices 204(1)-204(n) that hosts a plurality of databases 206(1)-206

(n), and also to a plurality of client devices 208(1)-208(n), and also to a plurality of safe deposit box warehouse facility devices 212(1)-212(n) via communication network(s) 210. A communication interface of the SDBM device 202, such as the network interface 114 of the computer system 102 of FIG. 1, operatively couples and communicates between the SDBM device 202, the server devices 204(1)-204(n), the client devices 208(1)-208(n), and/or the safe deposit box warehouse facility devices 212(1)-212(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDBM device 202, the server devices 204(1)-204(n), the client devices 208(1)-208(n), and/or the safe deposit box warehouse facility devices 212(1)-212(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SDBM devices that provide an automated delivery of a safe deposit box.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDBM device 202 may be a standalone device or integrated with one or more other devices or apparatuses, such as one or more of the server devices 204(1)-204(n), for example. In one particular example, the SDBM device 202 may include or be hosted by one of the server devices 204(1)-204(n), and other arrangements are also possible. Moreover, one or more of the devices of the SDBM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SDBM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store customer data and data relating to safe deposit boxes, including facility locations, log data relating to accessing the boxes, and data relating to box contents.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the generation of user requests for a delivery of a safe deposit box or for accessing a safe deposit box, such as in response to user interaction with graphical user interfaces for example. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the SDBM device 202 via the communication network(s) 210 in order to communicate user requests. The client devices 208(1)-208(n) may further include, among other features, a display device, such as a display screen or touchscreen, and/or an input device, such as a keyboard, for example.

The plurality of safe deposit box warehouse facility devices 212(1)-212(n) may be the same or similar to the computer system 102 or the computer device 120 as described with respect to FIG. 1, including any features or combination of features described with respect thereto. For example, any of the safe deposit box warehouse facility devices 212(1)-212(n) may include, among other features, one or more processors, a memory, and a communication interface, which are coupled together by a bus or other communication link, although other numbers and/or types of network devices may be used. The safe deposit box warehouse facility devices 212(1)-212(n) in this example may process requests received from the SDBM device 202 via the communication network(s) 210 according to the HTTP-based and/or JavaScript Object Notation (JSON) protocol, for example, although other protocols may also be used.

The safe deposit box warehouse facility devices 212(1)-212(n) may be hardware or software or may represent a system with multiple servers in a pool, which may include internal or external networks. The safe deposit box warehouse facility devices 212(1)-212(n) are communicatively coupled with smart safe deposit boxes (SDB) 214(1)-214(n), each of which, in an exemplary embodiment, includes a communicator that is configured to communicate by using wireless fidelity (Wi-Fi) and/or Bluetooth, and also includes at least one biometric sensor, such as, for example, a fingerprint sensor and/or a facial recognition sensor, which is configured to perform an authentication function with respect to a user requesting access to the corresponding smart safe deposit box 214. In addition, each smart SDB 214 may include a near field communication (NFC) sensor. Each smart SDB 214 may be configured to track one or more box parameters, such as, for example, a current location of the smart SDB 214, a box opening time at which the smart SDB 214 is accessed, a box closing time at which the smart SDB 214 is closed, and an identification of a person that has accessed the smart SDB 214. In addition, each smart SDB 214 may be further configured to transmit the tracked box parameters to a corresponding safe deposit box warehouse facility device 212 and/or to the SDBM device 202 via the communication network(s) 210.

Although the exemplary network environment 200 with the SDBM device 202, the server devices 204(1)-204(n), the client devices 208(1)-208(n), the safe deposit box warehouse facility devices 212(1)-212(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDBM device 202, the server devices 204(1)-204(n), the client devices 208(1)-208(n), or the safe deposit box warehouse facility devices 212(1)-212(n), for example, may be configured to operate as virtual instances on the same physical machine. In other words, one or more of the SDBM device 202, the server devices 204(1)-204(n), the client devices 208(1)-208(n), or the safe deposit box warehouse facility devices 212(1)-212(n) may operate on the same physical device rather than as separate devices communicating through communication network(s) 210. Additionally, there may be more or fewer SDBM devices 202, server devices 204(1)-204(n), client devices 208(1)-208(n), or safe deposit box warehouse facility devices 212(1)-212(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
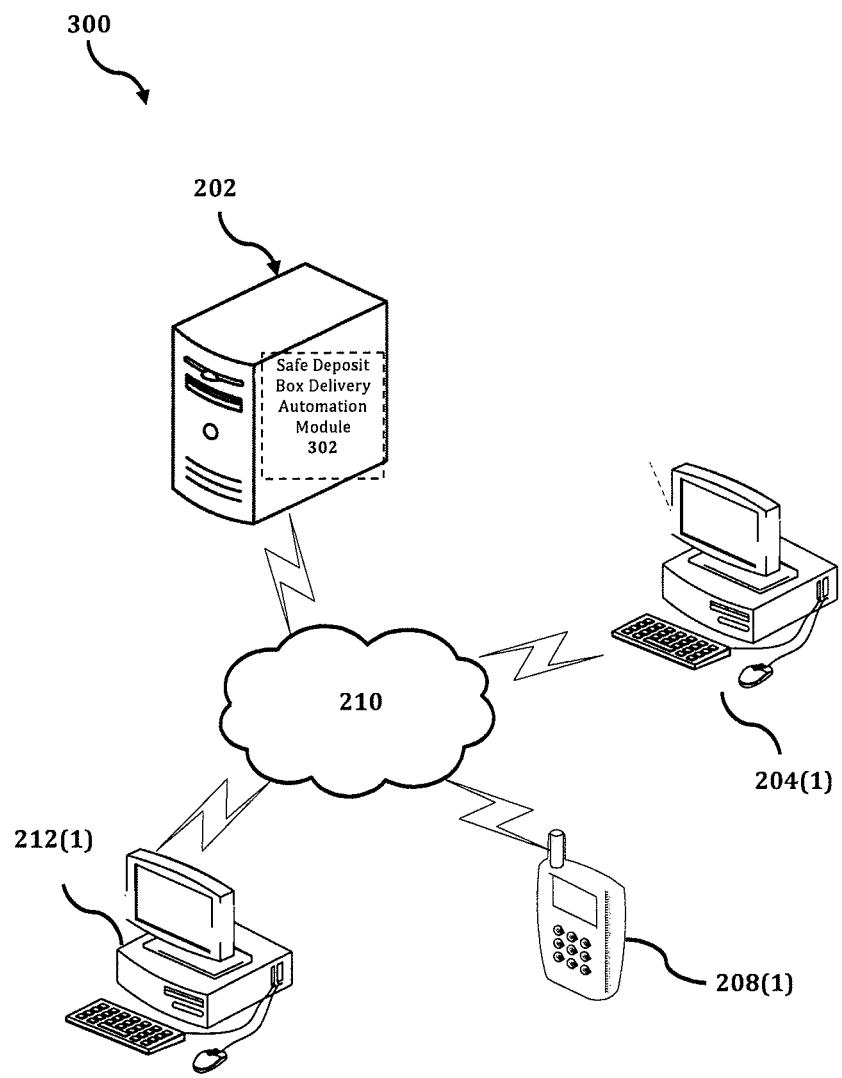
FIG. 3 shows an exemplary system for automating a delivery of a safe deposit box.

The SDBM device 202 is described and shown in FIG. 3 as including a safe deposit box delivery automation module 302, although it may include other rules, policies, modules, databases, or applications, for example. As will be described below, the safe deposit box delivery module 302 is configured to implement a method for providing an automated delivery of a safe deposit box.

An exemplary process 300 for providing an automated delivery of a safe deposit box by utilizing the network environment of FIG. 2 is shown as being conducted in FIG. 3. Specifically, a first client device 208(1) and a first safe deposit box warehouse facility device 212(1) are illustrated as being in communication with SDBM device 202. In this regard, the first client device 208(1) and the first safe deposit box warehouse facility device 212(1) may be "clients" of the SDBM device 202 and are described herein as such. Nevertheless, it is to be known and understood that the first client device 208(1) and/or the first safe deposit box warehouse facility device 212(1) need not necessarily be "clients" of the SDBM device 202, or any entity described in association therewith herein. Any additional or alternative relationship may exist between either or both of the first client device 208(1) and the first safe deposit box warehouse facility device 212(1) and the SDBM device 202, or no relationship may exist.

The first client device 208(1) may be, for example, a smart phone. Of course, the first client device 208(1) may be any additional device described herein. The first safe deposit box warehouse facility device 212(1) may be, for example, a personal computer (PC). Of course, the first safe deposit box warehouse facility device 212(1) may also be any additional device described herein.

The process may be executed via the communication network(s) 210, which may comprise plural networks as described above. For example, in an exemplary embodiment, either or both of the first client device 208(1) and the first safe deposit box warehouse facility device 212(1) may communicate with the SDBM device 202 via broadband or cellular communication. Of course, these embodiments are merely exemplary and are not limiting or exhaustive.

Upon being started, the safe deposit box delivery automation module 302 executes a process for providing an automated delivery of a safe deposit box. An exemplary process for providing an automated delivery of a safe deposit box is generally indicated at flowchart 400 in FIG. 4.

Figure 4:
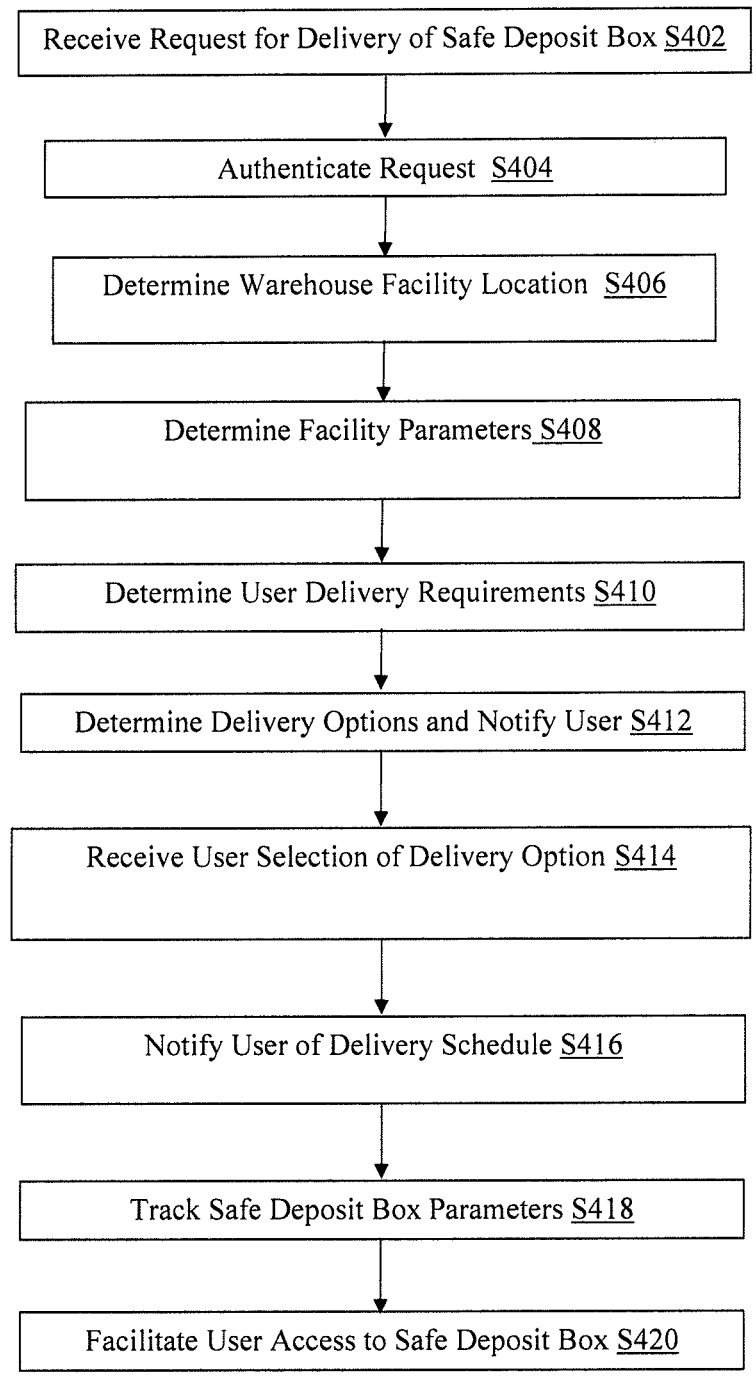
FIG. 4 is a flowchart of an exemplary process for providing an automated delivery of a safe deposit box.

In the process 400 of FIG. 4, a request for delivery of a safe deposit box is received from a client device 208 at step S402. The request may be generated by execution of an application that is downloadable to the client device 208. The downloadable application may provide a graphical user interface that provides prompts to a user to enter information to be included in the request, such as, for example, user login information, user location information, user payment information, user registration information, user account information, user preferences that relate to a smart safe deposit box (e.g., a preferred size of the box), delivery facility information, requested delivery date information, requested delivery time information. However, other types of information may also be included in the request.

At step S404, the request is authenticated. Authentication may be performed in any of several exemplary manners. For example, the request may include user login information, such as a username and a password, and the authentication may be based on whether the username and password are deemed to be valid. Alternatively, a biometric authentication may be performed by prompting the user to provide a biometric input, such as fingerprint information, thumbprint information, and/or facial recognition information, and comparing the received biometric information with previously stored biometric data to determine whether there is a match therebetween.

At step S406, the safe deposit box delivery automation module 302 determines at least one safe deposit box warehouse facility location that relates to the smart safe deposit box to be delivered. In an exemplary embodiment, the determination is based on information included in the user request. For example, by using location information that indicates an area that is within a predetermined proximity of the user, the safe deposit box delivery automation module 302 may determine that there are two, three, four, or any other number of warehouse facilities that are candidates for implementing the delivery of the smart safe deposit box.

At step S408, the safe deposit box delivery automation module 302 determines at least one facility parameter that relates to the identified warehouse facilities. In an exemplary embodiment, the facility parameters may include any one or more of a number of pending requests at the respective warehouse facility, a delivery vehicle availability for the respective warehouse facility, operation hours of the respective warehouse facility, and a number of available resources (e.g., a number of boxes and a number of storage spaces) at the respective warehouse facility.

At step S410, the safe deposit box delivery automation module 302 determines user delivery requirements based on the information included in the user request. In an exemplary embodiment, the user delivery requirements may include any one or more of size information that relates to the smart safe deposit box to be delivered, delivery location information, delivery date information, and delivery time information, although other types of delivery requirements may also be determined. In addition, the user delivery requirements may include cost information that relates to user-selectable parameters. For example, each potential box size may be associated with a respective cost, and there may be different costs that relate to whether the delivery is requested within a particular time window, such as, for example, within one day, within two days, or within one week.

At step S412, the safe deposit box delivery automation module 302 determines at least one delivery option for the proposed delivery of a smart safe deposit box, and notifies the user of the available options. In an exemplary embodiment, the determination of possible delivery options is based on one or more of information included in the user request, the identified warehouse facility locations, the facility parameters, and the user delivery requirements.

In an exemplary embodiment, when the user is executing the downloaded application on the client device 208, information that relates to the available options may be transmitted from the SDBM device 202 to the client device 208 and then displayed on a screen of the client device 208, thereby prompting the user to make a selection by providing an input via the client device 208. When the user selects a delivery option, the client device 208 then transmits the selected option to the SBDM device 208, and the user selection is then received at step S414. As a result, at step S416, the safe deposit box delivery automation module 302 notifies the user of a delivery schedule by transmitting a message that is generated based on the received user selection.

At step S418, after a smart safe deposit box 214 has been delivered to the user, the safe deposit box delivery automation module 302 tracks various box parameters that relate to the smart safe deposit box 214. In an exemplary embodiment, the box parameters may include any one or more of a current location of the smart safe deposit box 214, a box opening time at which the smart safe deposit box 214 is accessed, a box closing time at which the smart safe deposit box 214 is closed, and an identification of a person that has accessed the smart safe deposit box 214.

At step S420, the safe deposit box delivery automation module 302 facilitates access to the smart safe deposit box 214. An exemplary process for providing access to the smart safe deposit box 214 is generally indicated at flowchart 500 in FIG. 5. In an exemplary embodiment, this method may be implemented by executing the downloaded application on the client device 208.

Figure 5:
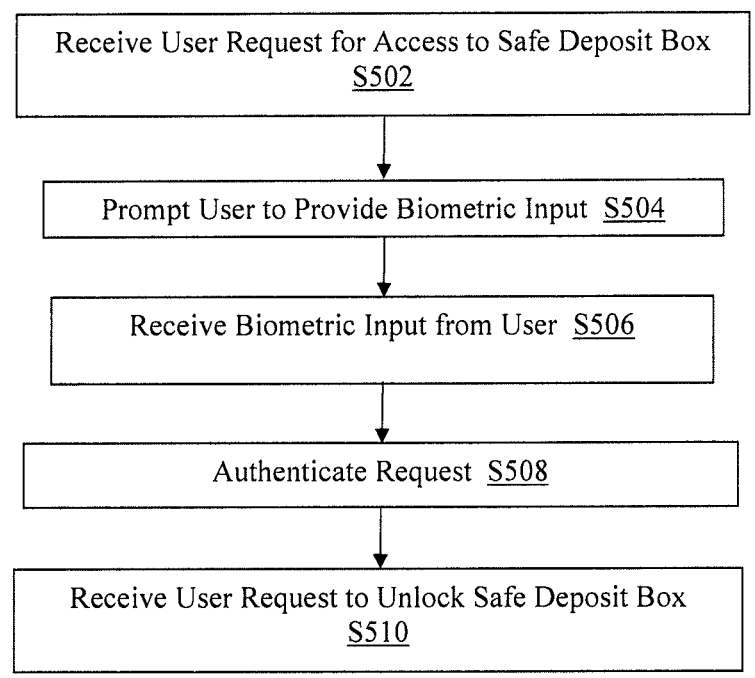
FIG. 5 is a flowchart of an exemplary process for facilitating user access to a safe deposit box.

Referring to FIG. 5, at step S502, the safe deposit box delivery automation module 302 receives a user request for access to the safe deposit box. In an exemplary embodiment, the user executes the downloaded application on the client device 208, and provides the user request by entering an input via the client device 208.

At step S504, the safe deposit box delivery automation module 302 prompts the user to provide a biometric input, such as, for example, a fingerprint input and/or a facial recognition input. The safe deposit box delivery automation module receives the user's biometric input at step S506, and then uses this input to authenticate the user at step S508. In an exemplary embodiment, the authentication is performed by comparing the received biometric information with previously stored biometric data to determine whether there is a match therebetween.

Alternatively, instead of using a biometric input, the safe deposit box delivery automation module 302 may perform the authentication by using any one or more of a username/password combination, a bar code, a quick response (QR) code, or any other suitable authentication methodology.

At step S510, upon successful authentication of the user request to access the safe deposit box, a user request to unlock the safe deposit box is received by the safe deposit box delivery automation module 302. When the request to unlock is received, the safe deposit box delivery automation module 302 unlocks the safe deposit box, thereby enabling the user to access the contents of the box. In an exemplary embodiment, the safe deposit box delivery automation module 302 wirelessly transmits a signal to the smart safe deposit box 214 that causes an unlocking mechanism to unlock the box.

Accordingly, with this technology, an optimized process for providing automated delivery of a safe deposit box is provided. The optimized process may be implemented by executing a downloadable application on a client device, such as a personal computer or a smart mobile phone.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an automated delivery of a safe deposit box, the method being implemented by a safe deposit box management device that includes a processor and a communication interface, the method comprising:
   receiving, by the processor via the communication interface, a first user request for the delivery of the safe deposit box, the safe deposit box being transportable, and the first user request including user account information;
   determining, based on information included in the first user request, at least one safe deposit box warehouse facility location that relates to the safe deposit box to be delivered;
   determining, based on the determined at least one safe deposit box warehouse facility location, at least one facility parameter;
   determining, based on the information included in the first user request, at least one user delivery requirement that relates to the safe deposit box to be delivered;
   determining, based on each of the at least one safe deposit box warehouse facility location, the at least one facility parameter, and the at least one user delivery requirement, at least one delivery option;
   receiving, by the processor via the communication interface, a user selection from among the at least one delivery option; and
   transmitting, via the communication interface, information relating to a delivery schedule for delivering the safe deposit box, the delivery schedule being determined based on the received user selection.

2. The method of claim 1, wherein the safe deposit box includes a communicator configured to communicate with the safe deposit box management device by using at least one from among a wireless fidelity protocol and a Bluetooth protocol, and
   wherein the method further comprises tracking at least one box parameter by receiving a transmission from the communicator, the at least one box parameter including at least one from among a current location of the safe deposit box, a box opening time at which the safe deposit box is accessed, a box closing time at which the safe deposit box is closed, and an identification of a person that has accessed the safe deposit box.

3. The method of claim 2, wherein the safe deposit box includes at least one from among a near field communication sensor and a biometric sensor configured to sense information that relates to the identification of the person that has accessed the safe deposit box, the biometric sensor including at least one from among a fingerprint sensor and a facial recognition sensor.

4. The method of claim 1, wherein the at least one facility parameter includes at least one from among a number of pending requests at the safe deposit box warehouse facility, a delivery vehicle availability of the safe deposit box warehouse facility, operation hours of the safe deposit box warehouse facility, and a number of available resources at the safe deposit box warehouse facility.

5. The method of claim 1, further comprising authenticating the received first user request by prompting a user to provide identification information and determining whether the identification information relates to a person that is authorized to receive the delivery of the safe deposit box.

6. The method of claim 5, wherein the receiving the first user request comprises receiving the first user request from a client device on which a safe deposit box accessing application has been downloaded, the client device including at least one from among a personal computing device and a smart phone.

7. The method of claim 6, further comprising:
receiving, from the client device, a second user request that relates to accessing the safe deposit box;
authenticating the received second user request by prompting the user to provide identification information and determining whether the identification information relates to an authorized user; and
receiving, from the client device, a third user request that relates to unlocking the safe deposit box,
wherein the identification information includes at least one from among information sensed by a near field communication sensor, fingerprint information of the user and facial recognition information of the user.

8. A safe deposit box management device configured to provide an automated delivery of a safe deposit box, comprising:
a communication interface; and
a processor,
wherein the processor is configured to:
receive, via the communication interface, a first user request for the delivery of the safe deposit box, the safe deposit box being transportable, and the first user request including user account information;
determine, based on information included in the first user request, at least one safe deposit box warehouse facility location that relates to the safe deposit box to be delivered;
determine, based on the determined at least one safe deposit box warehouse facility location, at least one facility parameter;
determine, based on the information included in the first user request, at least one user delivery requirement that relates to the safe deposit box to be delivered;
determine, based on each of the at least one safe deposit box warehouse facility location, the at least one facility parameter, and the at least one user delivery requirement, at least one delivery option;
receive, via the communication interface, a user selection from among the at least one delivery option; and
transmit, via the communication interface, information relating to a delivery schedule for delivering the safe deposit box, the delivery schedule being determined based on the received user selection.

9. The safe deposit box management device of claim 8, wherein the safe deposit box includes a communicator configured to communicate with the safe deposit box management device by using at least one from among a wireless fidelity protocol and a Bluetooth protocol, and
wherein the processor is further configured to track at least one box parameter by receiving a transmission from the communicator, the at least one box parameter including at least one from among a current location of the safe deposit box, a box opening time at which the safe deposit box is accessed, a box closing time at which the safe deposit box is closed, and an identification of a person that has accessed the safe deposit box.

10. The safe deposit box management device of claim 9, wherein the safe deposit box includes at least one from among a near field communication sensor and a biometric sensor configured to sense information that relates to the identification of the person that has accessed the safe deposit box, the biometric sensor including at least one from among a fingerprint sensor and a facial recognition sensor.

11. The safe deposit management box of claim 8, wherein the at least one facility parameter includes at least one from among a number of pending requests at the safe deposit box warehouse facility, a delivery vehicle availability of the safe deposit box warehouse facility, operation hours of the safe deposit box warehouse facility, and a number of available resources at the safe deposit box warehouse facility.

12. The safe deposit box management device of claim 8, wherein the processor is further configured to authenticate the received first user request by prompting a user to provide identification information and determining whether the identification information relates to a person that is authorized to receive the delivery of the safe deposit box.

13. The safe deposit box management device of claim 12, wherein the processor is further configured to receive the first user request from a client device on which a safe deposit box accessing application has been downloaded, the client device including at least one from among a personal computing device and a smart phone.

14. The safe deposit box management device of claim 13, wherein the processor is further configured to:
receive, from the client device, a second user request that relates to accessing the safe deposit box;
authenticate the received second user request by prompting the user to provide identification information and determining whether the identification information relates to an authorized user; and
receive, from the client device, a third user request that relates to unlocking the safe deposit box,
wherein the identification information includes at least one from among information sensed by a near field communication sensor, fingerprint information of the user and facial recognition information of the user.

15. A non-transitory computer-readable medium configured to store instructions for implementing a method for providing an automated delivery of a safe deposit box, wherein when executed, the instructions cause a computer to:

receive a first user request for the delivery of the safe deposit box, the safe deposit box being transportable, and the first user request including user account information;

determine, based on information included in the first user request, at least one safe deposit box warehouse facility location that relates to the safe deposit box to be delivered;

determine, based on the determined at least one safe deposit box warehouse facility location, at least one facility parameter;

determine, based on the information included in the first user request, at least one user delivery requirement that relates to the safe deposit box to be delivered;

determine, based on each of the at least one safe deposit box warehouse facility location, the at least one facility parameter, and the at least one user delivery requirement, at least one delivery option;

receive a user selection from among the at least one delivery option; and transmit, to a user, information relating to a delivery schedule for delivering the safe deposit box, the delivery schedule being determined based on the received user selection.

16. The computer-readable medium of claim 15, wherein the safe deposit box includes a communicator configured to communicate with the safe deposit box management device by using at least one from among a wireless fidelity protocol and a Bluetooth protocol, and wherein the instructions further cause the computer to track at least one box parameter by receiving a transmission from the communicator, the at least one box parameter including at least one from among a current location of the safe deposit box, a box opening time at which the safe deposit box is accessed, a box closing time at which the safe deposit box is closed, and an identification of a person that has accessed the safe deposit box.

17. The computer-readable medium of claim 16, wherein the safe deposit box includes at least one from among a near field communication sensor and a biometric sensor configured to sense information that relates to the identification of the person that has accessed the safe deposit box, the biometric sensor including at least one from among a fingerprint sensor and a facial recognition sensor.

18. The computer-readable medium of claim 15, wherein the instructions further cause the computer to authenticate the received first user request by prompting a user to provide identification information and determining whether the identification information relates to a person that is authorized to receive the delivery of the safe deposit box.

19. The computer-readable medium of claim 18, wherein the instructions further cause the computer to receive the first user request from a client device on which a safe deposit box accessing application has been downloaded, the client device including at least one from among a personal computing device and a smart phone.

20. The computer-readable medium of claim 19, wherein the instructions further cause the computer to:

receive, from the client device, a second user request that relates to accessing the safe deposit box;

authenticate the received second user request by prompting the user to provide identification information and determining whether the identification information relates to an authorized user; and receive, from the client device, a third user request that relates to unlocking the safe deposit box, wherein the identification information includes at least one from among information sensed by a near field communication sensor, fingerprint information of the user and facial recognition information of the user.

* * * * *